W. MIKS.
FEEDER FOR ALFALFA MILLS.
APPLICATION FILED DEC. 9, 1909.
955,090.
Patented Apr. 12, 1910.
2 SHEETS—SHEET 1.
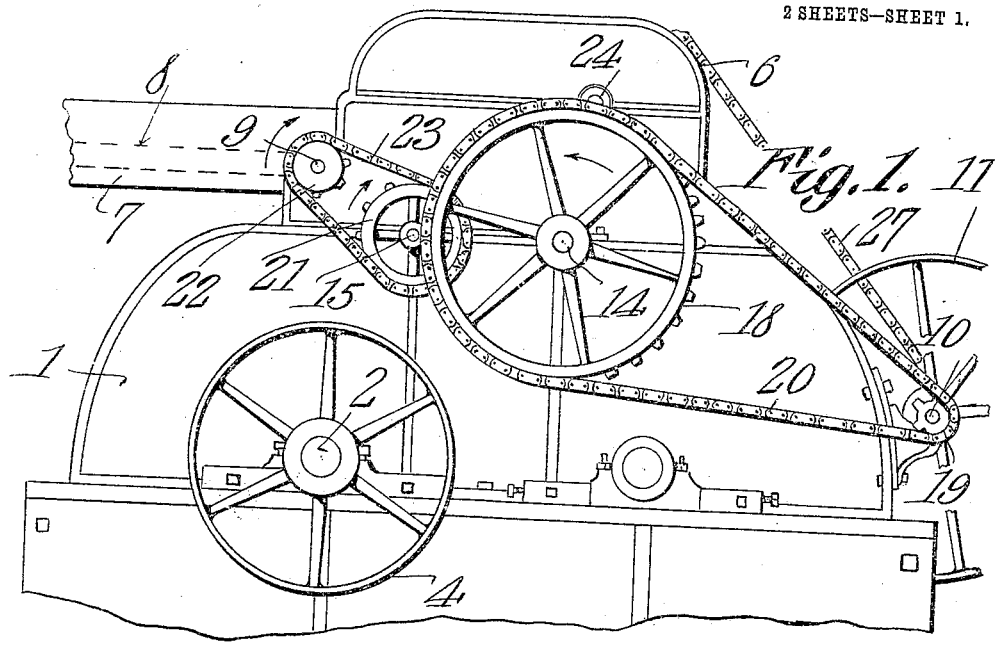
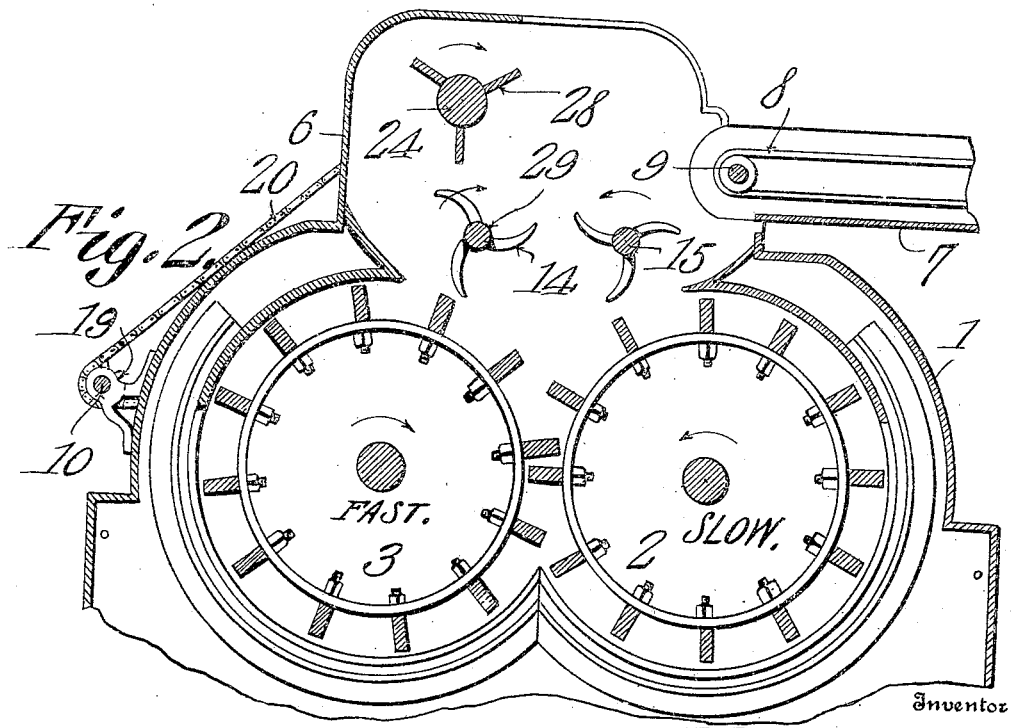

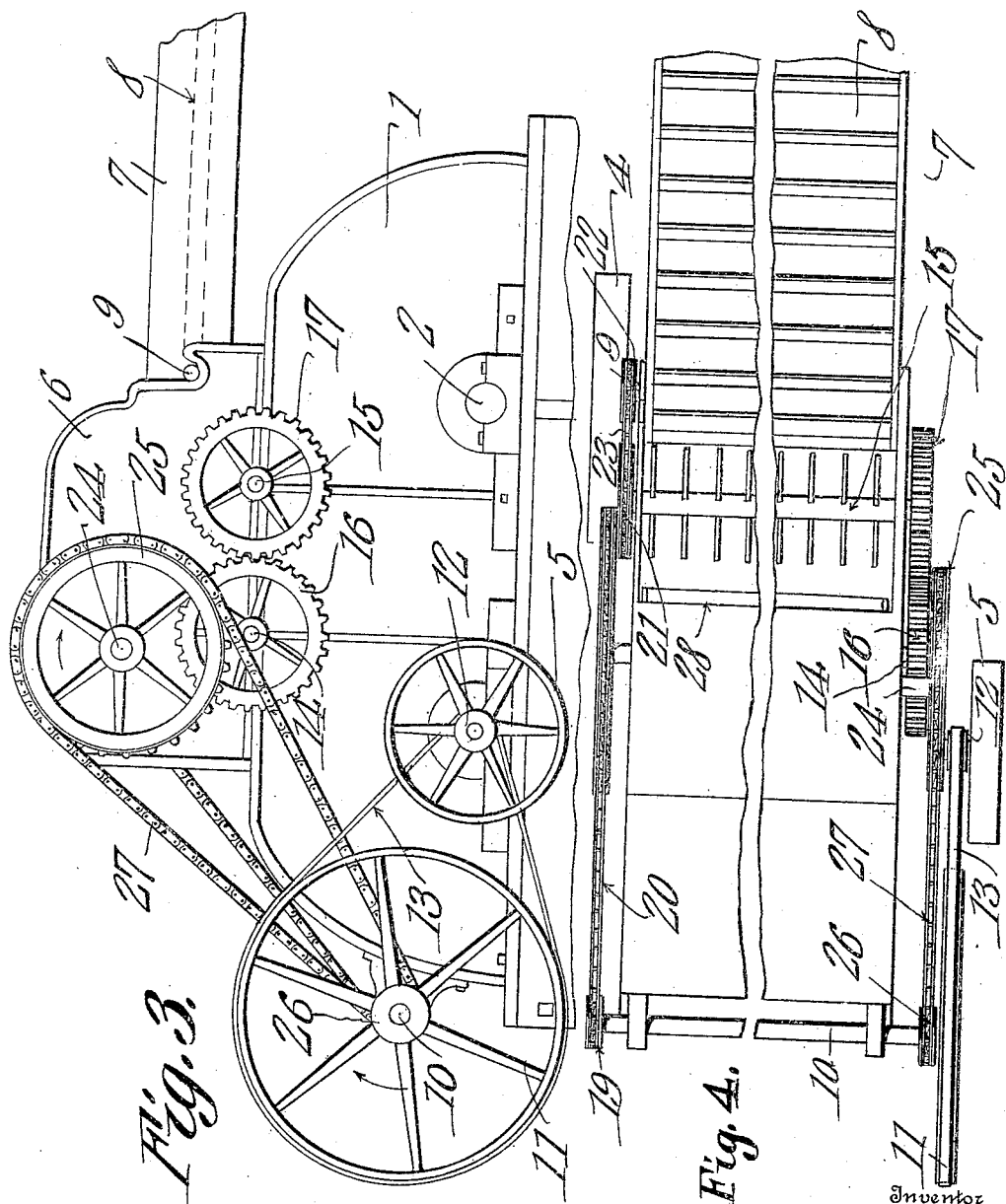

UNITED STATES PATENT OFFICE.

WALTER MIKS, OF MAYFIELD, KANSAS.

FEEDER FOR ALFALFA-MILLS.

955,090.     Specification of Letters Patent.     Patented Apr. 12, 1910.

Application filed December 9, 1909. Serial No. 532,220.

*To all whom it may concern:*

Be it known that I, WALTER MIKS, a citizen of the United States, residing at Mayfield, in the county of Sumner and State of Kansas, have invented a new and useful Feeder for Alfalfa-Mills, of which the following is a specification.

This invention has relation to feeders especially adapted to be used in connection with alfalfa mills and it consists in the novel construction and arrangement of its parts as hereinafter shown and described.

The object of the invention is to provide a feeding device adapted to be operated from the shaft of one of the shredding cylinders of the mill and to so arrange the parts of the feeder that the hay will be promptly fed to the shredding cylinders of the mill but at the same time the surplus hay will be retarded in order that the volume of hay presented to the shredding cylinders may not assume such proportions as to check or interfere with the proper operation of the cylinders upon the same. A beater is used in combination with the feeding and retarding mechanism and is adapted to operate upon bunches or bundles of hay with a view of tearing the same into shreds before it is operated upon by the said feeders and retarders.

In the accompanying drawings Figure 1 is a side elevation of the feeder applied to the upper portion of a mill. Fig. 2 is a sectional view of the feeder and a portion of the mill. Fig. 3 is a side elevation of the feeder from the side opposite to that shown in Fig. 1. Fig. 4 is a top plan view of the feeder with parts broken away.

As illustrated in the accompanying drawing the reference numeral 1 indicates the upper portion of an alfalfa mill in which is journaled for rotation coöperating cylinders 2 and 3. The shaft of the cylinder 2 is provided with a relatively large pulley 4 and the shaft of the cylinder 3 is provided with a relatively small pulley 5. These pulleys are located at opposite sides of the casing 1 and are usually belted up with the same shaft consequently the cylinder 2 rotates at a slower rate of speed than the cylinder 3.

The cylinders 2 and 3 are provided upon their peripheries with radially disposed knives similar to those usually employed upon a threshing machine cylinder and inasmuch as the said cylinders rotate at different rates of speed the material engaged by the said knives is shredded or torn apart and is passed down through a suitable opening provided in the top of the mill 1 below the said cylinders.

A hood 6 is mounted upon the casing 1 and one end of a conveyer trunk 7 is connected with the side of the said hood. An endless belt 8 is arranged for movement along the trunk 7 and is actuated by a shaft 9 which may also serve as pivot connection for the trunk 7 with the said hood 6.

A shaft 10 is journaled for rotation at the side of the casing 1 and is provided with a pulley wheel 11. A pulley 12 is fixed to the shaft of the cylinder 3 and a belt 13 passes around the pulleys 11 and 12. Shafts 14 and 15 are journaled for rotation at the upper edge of the casing 1 and the lower edge of the hood 6, and are provided upon one end with intermeshing gear wheels 16 and 17, whereby the said shafts are caused to rotate in unison toward each other. A sprocket wheel 18 is fixed to the shafts 14 and a sprocket wheel 19 is fixed to the shaft 10. A sprocket chain 20 is arranged to move about the peripheries of the sprocket wheels 18 and 19 and transmit rotary movement from the shaft 10 to the shaft 14. A sprocket wheel 21 is fixed to the end of the shaft 15 and a sprocket wheel 22 is fixed to the end of the shaft 9. A sprocket chain 23 is arranged to move about the peripheries of the sprocket wheels 21 and 22 and transmit rotary movement from the shaft 15 to the shaft 9. The axes of the shafts 14 and 15 are closer to each other than the axes of the cylinders 2 and 3, and the axis of the shaft 14 is at the same distance from the vertical plane of the axis of the cylinder 3 as the axis of the shaft 15 from the axis of the cylinder 2.

A beater shaft 24 is journaled for rotation in the upper portion of the hood 6 toward that end thereof opposite the end with which the conveyer trunk 7 connects. A sprocket wheel 25 is fixed to the end of the shaft 24 and a sprocket wheel 26 is fixed to the shaft 10. A sprocket chain 27 is arranged to move about the peripheries of the wheels 25 and 26 and is adapted to transmit rotary movement from the shaft 10 to the shaft 24. Radially disposed beater blades 28 are fixed at their inner ends to the shaft 24 at the portion thereof which is under the hood 6. Curved feeder and retarder arms 29 are fixed to the intermediate portions of the shafts 14 and 15 and the arms 29 have their convexed edges disposed in the direction in which the shafts upon which they are mounted turn.

By this arrangement of parts it will be observed that when the feeder is in operation the upper run of the belt 8 will move toward the hood 6. Thus material placed upon the upper run of the said belt is conveyed to the said hood. Inasmuch as the shafts 14 and 15 rotate toward each other the said material as it is deposited upon the arms 29 carried by the said shafts is forced down between the said shafts into engagement with the peripheries of the cylinders 2 and 3. Inasmuch as the said cylinders are rotating at different rates of speed but at a much higher rate speed than the shafts 14 and 15 the material is grasped and drawn down through the spaces between the arms 29. However the said arms 29 will prevent an excess of material from being fed to the said cylinders 2 and 3 consequently the said cylinders cannot become choked in consequence of an extra large bunch of material being drawn against them. Inasmuch as the shaft 24 is located in the vicinity of that end of the hood 6 opposite the end thereof with which the trunk 7 connects and rotates over toward the said trunk the material as it enters the hood is operated upon by the blades 28 which meet and draw into shreds thus breaking up any lumps or bunches that may be therein. By this arrangement of parts it will be seen while means are provided for feeding the hay in regular quantities to the shredding cylinders that the said feeding means also operates as a retarding means and prevents an excess of feed.

Having described my invention what I claim as new and desire to secure by Letters-Patent is:

In combination with a mill having shredding cylinders journaled for simultaneous rotation at different rates of speed, a feeder including a hood, shafts journaled for rotation in the hood and carrying feeding and retarding arms, and means for causing said shafts to rotate toward each other at a slower rate of speed than that at which the slower cylinder rotates.

In testimony that I claim the foregoing as my own, I have hereto affixed my signature in the presence of two witnesses.

WALTER MIKS.

Witnesses:
   H. K. STREMM,
   L. A. CHANDLER.